US010344629B2

(12) United States Patent
Stapelmann et al.

(10) Patent No.: US 10,344,629 B2
(45) Date of Patent: Jul. 9, 2019

(54) METHOD FOR ARRANGING A CAMSHAFT IN A CAMSHAFT MODULE

(71) Applicant: ThyssenKrupp Presta TecCenter AG, Eschen (LI)

(72) Inventors: Andreas Stapelmann, Chemnitz (DE); Michael Hartwig, Peine (DE); Mario Ilgeroth, Thale (DE); Frank Altag, Denkte (DE); Marko Curlic, Nendeln (LI); Aaron Pfitscher, Ludesch (AT)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 203 days.

(21) Appl. No.: 15/325,666

(22) PCT Filed: Jul. 1, 2015

(86) PCT No.: PCT/EP2015/064927
§ 371 (c)(1),
(2) Date: Jan. 11, 2017

(87) PCT Pub. No.: WO2016/005237
PCT Pub. Date: Jan. 14, 2016

(65) Prior Publication Data
US 2017/0159505 A1  Jun. 8, 2017

(30) Foreign Application Priority Data
Jul. 11, 2014 (DE) .................. 10 2014 109 751

(51) Int. Cl.
F01L 1/047 (2006.01)
F01L 13/00 (2006.01)
F16H 53/02 (2006.01)

(52) U.S. Cl.
CPC ........... *F01L 1/047* (2013.01); *F01L 13/0036* (2013.01); *B23P 2700/02* (2013.01);
(Continued)

(58) Field of Classification Search
CPC ..... F01L 1/04; F01L 13/0036; F01L 2103/00; F01L 2001/0476; F01L 2013/0052;
(Continued)

(56) References Cited

U.S. PATENT DOCUMENTS

2006/0157007 A1   7/2006   Horton
2007/0034184 A1   2/2007   Dengler
(Continued)

FOREIGN PATENT DOCUMENTS

CN          103732867 A      4/2014
DE     10 2004 011 586 A1   10/2004
(Continued)

OTHER PUBLICATIONS

Machine Translation for Cremerius, DE 102004001141 A1 (Year: 2005).*
(Continued)

*Primary Examiner* — Christopher J Besler
*Assistant Examiner* — Christine Pellazar Bersabal
(74) *Attorney, Agent, or Firm* — thyssenkrupp North America, Inc.

(57) ABSTRACT

A method for arranging a camshaft in a camshaft module includes arranging cam elements and a switching element on a carrier tube to so as to form a displacement element having a bearing section, outside or external to a module housing. The carrier tube is then cut in a region of a bearing section to form two parts. One of the parts is arranged into a bearing bridge in a module housing. The other part is then joined to the first part that was inserted into the bearing bridge.

8 Claims, 5 Drawing Sheets

(52) U.S. Cl.
CPC ............... *F01L 2001/0476* (2013.01); *F01L 2013/0052* (2013.01); *F01L 2103/00* (2013.01); *F16H 53/025* (2013.01)

(58) Field of Classification Search
CPC ... B23P 2700/02; B23P 15/00; B23P 2700/07; F16H 53/025; Y10T 29/49293; Y10T 29/49286; Y10T 29/49787; Y10T 29/49789; Y10T 29/49792; Y10T 29/49796
See application file for complete search history.

(56) References Cited

U.S. PATENT DOCUMENTS

| | | | |
|---|---|---|---|
| 2010/0058888 A1 | 3/2010 | Mueller et al. | |
| 2012/0111139 A1 | 5/2012 | Tisch et al. | |
| 2013/0000442 A1 | 1/2013 | Wiesner et al. | |

FOREIGN PATENT DOCUMENTS

| | | | |
|---|---|---|---|
| DE | 102004001141 A1 * | 8/2005 | .............. B23P 13/04 |
| DE | 10 2007 018 920 B3 | 8/2008 | |
| DE | 10 2007 027 979 A1 | 1/2009 | |
| DE | 10 2008 024 876 A1 | 11/2009 | |
| DE | 10 2010 027 656 A1 | 1/2011 | |
| DE | 10 2009 059 712 A1 | 9/2011 | |
| DE | 10 2010 020 035 A1 | 11/2011 | |
| DE | 10 2011 109 256 A1 | 2/2013 | |
| DE | 10 2011 111 580 A1 | 2/2013 | |
| EP | 1 936 131 A1 | 6/2008 | |
| WO | 2011/072782 A1 | 6/2011 | |

OTHER PUBLICATIONS

German Language International Search Report for for PCT/EP2015/064927, dated Nov. 5, 2015.
English Translation of International Search Report for for PCT/EP2015/064927, dated Nov. 5, 2015.
German Language Written Opinion of the International Searching Authority for for PCT/EP2015/064927.
English Translation of the Written Opinion of the International Searching Authority for for PCT/EP2015/064927.
English language translation of abstract of DE 10 2008 024 876 A1.
English language translation of abstract of DE 10 2010 020 035 A1.

* cited by examiner

METHOD FOR ARRANGING A CAMSHAFT IN A CAMSHAFT MODULE

CROSS REFERENCE TO RELATED APPLICATIONS

This application is a U.S. National Stage Entry of International Patent Application Serial Number PCT/EP2015/064927, filed Jul. 1, 2015, which claims priority to German Patent Application No. DE 102014109751.3 filed Jul. 11, 2014, the entire contents of both of which are incorporated herein by reference.

FIELD

The present invention relates to a method for arranging or assembling a camshaft in a camshaft module for the valve drive of an internal combustion engine.

BACKGROUND

Camshaft modules serve for accommodating at least one or preferably two camshafts in an arrangement parallel to one another, and the camshafts may be installed in a ready-to-use state into the module housing or may be subjected to finish machining only after having been installed. The camshaft module may then be arranged, as a ready-for-operation module, for example on the cylinder head of an internal combustion engine, such that the cam elements of the camshafts can interact with the pick-off elements for the purposes of controlling the valves. Here, use is also made of adjustable camshafts in an arrangement in a camshaft module, and adjustable camshafts comprise displacement elements, and it is advantageously possible for the camshafts to be arranged by way of the displacement elements in bearing bridges of the module housing. Here, the displacement elements bear the cam elements and a switching element for the axial displacement of the displacement element on a carrier tube. The displacement is realized by way of actuator pins which can interact with the switching elements in order to switch the displacement element back and forth between, for example, two or three axial positions. In this way, it is possible for the pick-off elements to interact with cam elements of different cam contours in order to actuate the valves with different timings.

Multiple displacement elements may be accommodated, in alignment on a common central axis, in a module housing, which displacement elements are rotatable about a common central axis, it only subsequently being possible for a toothed shaft to be led through the displacement elements in order to drive these in rotation conjointly and in order to ultimately form a ready-for-use camshaft. For this purpose, it is firstly provided for each displacement element to be accommodated in a dedicated bearing bridge, which bearing bridges are formed in the module housing. In order to accommodate the displacement elements in the bearing bridges, said displacement elements must be of split form, because it is generally the case that cam elements are arranged on both sides of the interposed bearing section. Since the bearing section of the displacement element, which is generally formed by the outer side of the carrier tube or by a bearing ring mounted thereon, is designed to be smaller than the cam elements, the displacement element cannot be readily introduced laterally, for example, into a non-split bearing section.

For example, DE 10 2004 011 586 A1 presents a camshaft module in which two camshafts with respective displacement elements can be accommodated. In order that the displacement elements can be accommodated in the bearing bridges, the bearing bridges are of split form. This gives rise to additional machining and assembly processes, and it is necessary for multiple individual parts to be provided, for example the screw elements for the screw connection of the bearing half-shells to the main body of the module housing. Furthermore, it must be ensured that the bearing half-shells are not interchanged during the assembly process. It is therefore desirable to provide a module housing with non-split bearing bridges into which the displacement elements can be inserted.

BRIEF DESCRIPTION OF THE DRAWINGS

The present disclosure is described in detail below with reference to the attached drawing figures, wherein.

DETAILED DESCRIPTION

Figure 1:
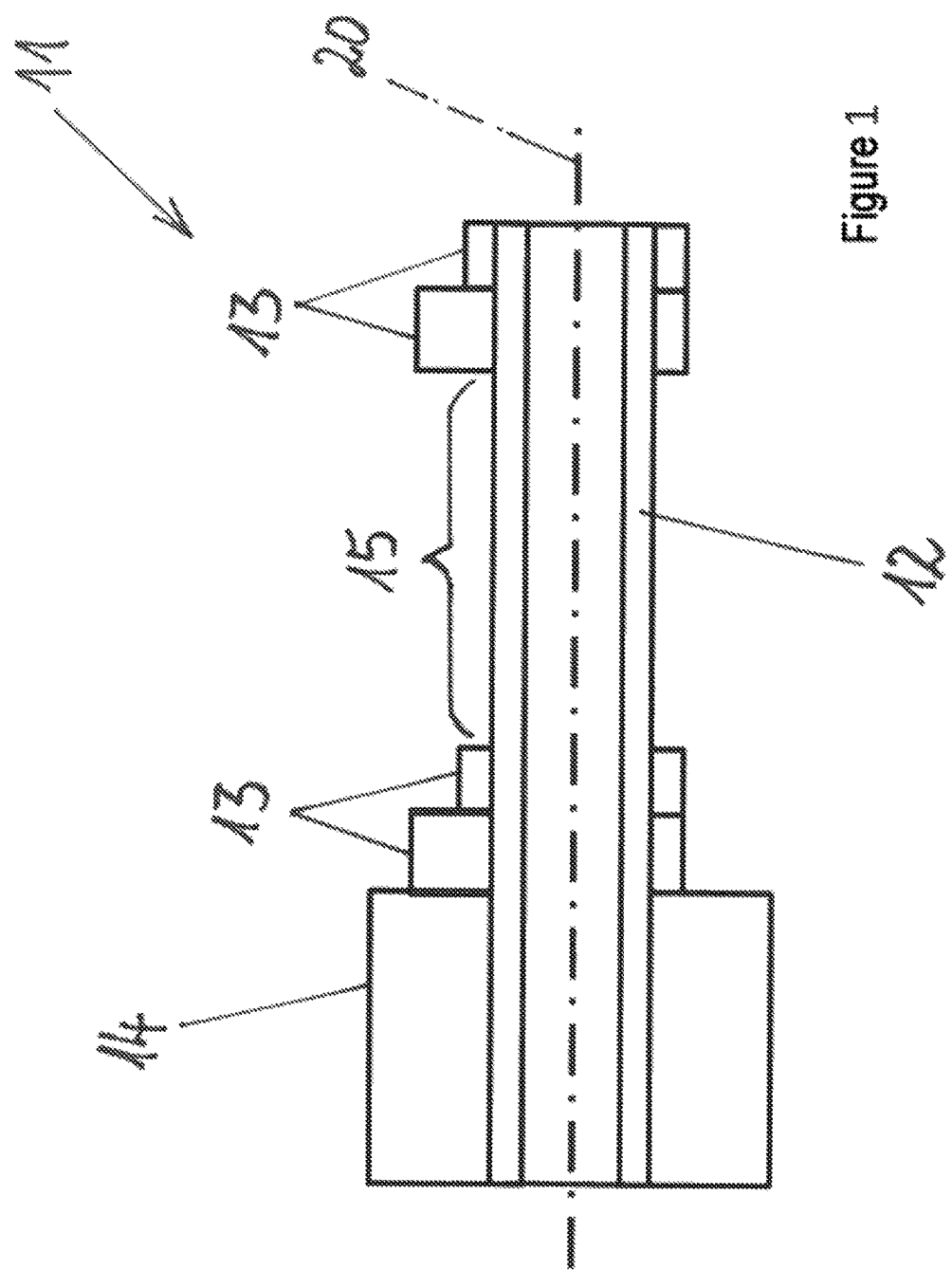
FIG. 1 is a schematic side cross section view of an embodiment of a displacement element of the present disclosure in a ready-for-use state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

A method for assembling or arranging a camshaft in a camshaft module so as to permit the assembly or arrangement of displacement elements of the camshaft in non-split bearing bridges, is disclosed herein. In one embodiment the method includes arranging cam elements and a switching element on a carrier tube, with the bearing section being formed, so as to provide a displacement element outside the module housing. The carrier tube is then severed or cut into two parts in the region of the bearing section. A connecting sleeve is then arranged on, or coupled to, one of the two parts. One of the two parts is inserted into the bearing bridge in the module housing, and the other part is then joined to the part that was inserted into the bearing bridge.

The method according to the invention is based on the concept of the displacement element with the carrier tube, the cam elements and the switching element being fully produced, and provided in a ready-for-use state, outside the module housing. Subsequently, the carrier tube is cut, such that the displacement element is split into two parts. In this way, a first part of the displacement element can be guided into the bearing bridge from a first side and connected to the further part. As a result, it is thus possible for the displacement element to be inserted rotatably into a closed, unipartite bearing bridge in the module housing, with this merely being followed by joining of the two parts of the displacement element while at least one part or both parts are partially seated in at least one section of the bearing bridge. When one or more displacement elements has/have been inserted by way of the method according to the invention into respective bearing bridges of the module housing, it is finally also possible for a toothed shaft to be led through the displacement elements, by way of which toothed shaft said displacement elements are driven, and which toothed shaft completes the camshaft. The cam elements may in this case be of unipartite or two-part form, and one cam element or cam element pair may be situated on one part of the cut carrier tube, and a further cam element or cam element pair may be situated on the other part of the cut carrier tube.

It is particularly advantageously possible for the displacement element provided outside the module housing to be machined into a ready-for-use state by way of at least one chip-removing machining process. The machining into a ready-for-use state may be performed for example by way of a grinding process and possibly also by way of a subsequent polishing process, in particular of the cam elements. The advantage of the fully produced displacement elements being machined into a ready-for-use state lies in the fact that grinding dust that is generated during a grinding machining process, for example of the cam elements, does not ingress into the module housing, as is the case when chip-removing machining of the camshaft is performed when the latter is arranged in the module housing. This yields the possibility of easier cleaning of the individual displacement elements before these are inserted by way of the method according to the invention into the module housing of the camshaft module.

The connecting sleeve may particularly advantageously be arranged on the outside of the bearing section of the carrier tube. In other words, the parts of the carrier tube can be pushed into the connecting sleeve, wherein the connecting sleeve may have a length which is dimensioned such that, for example, the carrier tubes at least almost make contact again after insertion into the connecting sleeve. A toothed structure is formed on the inner side of the carrier tube, which toothed structure engages with the toothed shaft of the camshaft, such that, in the event of rotation of the toothed shaft, the displacement elements co-rotate but are accommodated in axially displaceable fashion on the toothed shaft and/or in the bearing bridge. This function is not influenced by the splitting of the carrier tube.

The connecting sleeve may be pressed, shrink-fitted or adhesively bonded onto the outside of the bearing section of the carrier tube. Here, the connecting sleeve may have a ground surface both on the outside and preferably also on the inside, because, with a ground inner surface and/or a ground outer a circumferential surface, it is possible to adhere to very narrow tolerances that are required for the connecting sleeve. If the connecting sleeve connects the two separate parts of the carrier tube to one another, the outer circumferential surface of the connecting sleeve can form the bearing surface for the formation of a plain bearing in the bearing bridge. Therefore, the tolerance dimension of the outer circumferential surface of the connecting sleeve and the surface quality are of corresponding importance. An inner surface with narrow tolerances is required for a corresponding interference fit of the connecting sleeve on the carrier tube. The pressing-in of the carrier tube may thus be performed by way of a longitudinal interference fit or by way of a transverse interference fit. In the case of the longitudinal interference fit, the two parts of the carrier tube are pressed axially into the connecting sleeve, and, in the case of a transverse interference fit, the connecting sleeve is heated, and/or the parts of the carrier tube are cooled, in order to subsequently be connected to one another in non-positively locking fashion when temperature equalization occurs. Adhesive bonding methods or other methods may also be used in order to insert the parts of the carrier tube securely into the connecting sleeve.

During the chip-removing machining of the displacement element, the carrier tube may be ground so as to be ground to a relatively small diameter in the region of the bearing section before the latter is split into two parts by way of a cutting process. The section of relatively small diameter later forms the section by way of which the split carrier tube is inserted from both sides into the connecting sleeve, and the outer side of the connecting sleeve may for example have an equal or at least similar diameter to the rest of the carrier tube. It is thus also possible to use standard diameters of bearing bridges in module housings, because the connecting sleeve compensates the relatively small diameter of the carrier tube again, such that the module housing does not need to be adapted for the displacement elements inserted according to the invention into the bearing bridges.

The separating process for the splitting of the carrier tube may be realized by way of a sawing process, by way of an abrasive cutting process or by way of a thermal cutting process, for example by way of a laser-beam cutting process. When the carrier tube has been split, the parting surfaces of the carrier tube can be machined, in particular by way of a chip-removing machining process. In particular, insertion bevels may be formed onto the parting surface, such that the pressing-in of the respectively free end of the cut carrier tube into the connecting sleeve is facilitated.

As a final step, the method encompasses the introduction of the toothed shaft into the at least one displacement element, and preferably into multiple displacement elements in series, in order to complete the camshaft module.

Figure 5:
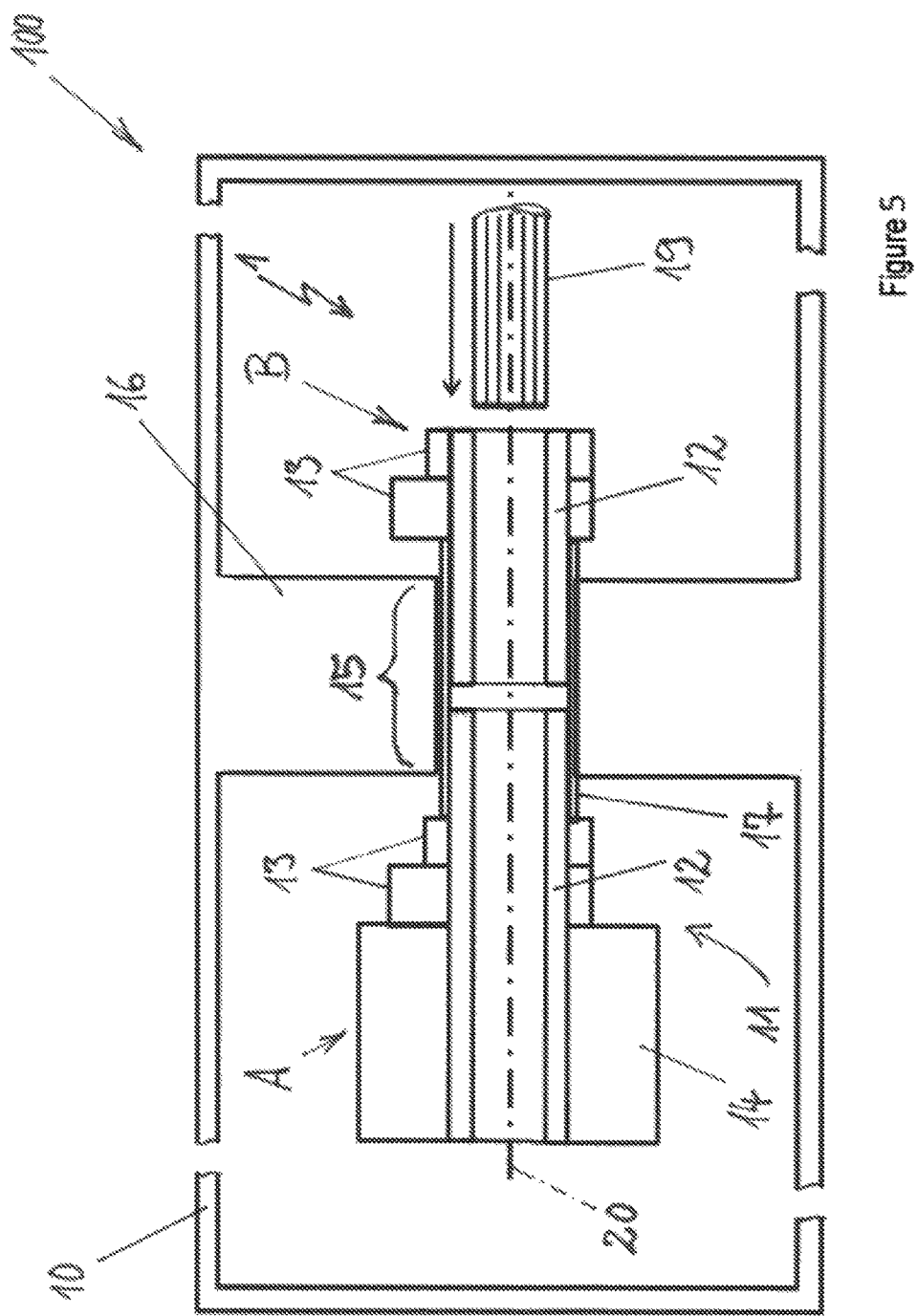
FIG. 5 is a schematic side cross section view of a camshaft module of the present disclosure, in which the camshaft module includes a module housing having a displacement element arranged or assembled within in a bearing bridge, by way of a method of the present disclosure.

FIG. 1 shows a displacement element 11 for arrangement in a module housing 10 of a camshaft module 100, as illustrated in FIG. 5.

The displacement element 11 comprises a carrier tube 12, and cam elements 13 and a switching element 14 are attached to the outer side of the carrier tube 12. The cam elements 13 are arranged, spaced apart from one another in pairwise fashion, on the carrier tube 12, and a first pair of, for example, two cam elements 13 is situated on a first side of a bearing section 15 of the carrier tube 12, and a further pair of, for example, two cam elements 13 is situated on the opposite side of the bearing section 15. Furthermore, the switching element 14 is seated on the carrier tube 12, which switching element adjoins one pair of cam elements 13.

The carrier tube 12 extends around a central axis 20 and, in a manner not shown in any more detail, comprises an internal toothing. A toothed shaft may be led through the carrier tube 12, such that an external toothing of the toothed shaft can be placed in engagement with the internal toothing in the carrier tube 12. In this way, when the toothed shaft rotates, the displacement element 11 can likewise be set in rotation, wherein the displacement element 11 remains longitudinally displaceable along the central axis 20. An axial displacement may be realized by way of the switching element 14 by virtue of an external actuator interacting with the switching element 14. In this way, the displacement element 11 can be placed into, for example, two different axial positions, such that, in a first position, a pick-off element interacts for example with a first cam element 13 of the cam pairs, and, in a further axial position of the displacement element 11, the same pick-off element can interact with a second cam element 13 of the respective cam pairs.

The bearing section 15, which forms a cylindrical section of the carrier tube 12, serves for the mounting of the displacement element 11 in the module housing.

The illustrated displacement element 11 is machined into a ready-for-use state, and it is for example possible for the cam contours of the cam elements 13 and the switching element 14 to be finish-machined in a chip-removing process, and the displacement element 11 shown can be supplied to a further step of the method according to the invention.

Figure 2:
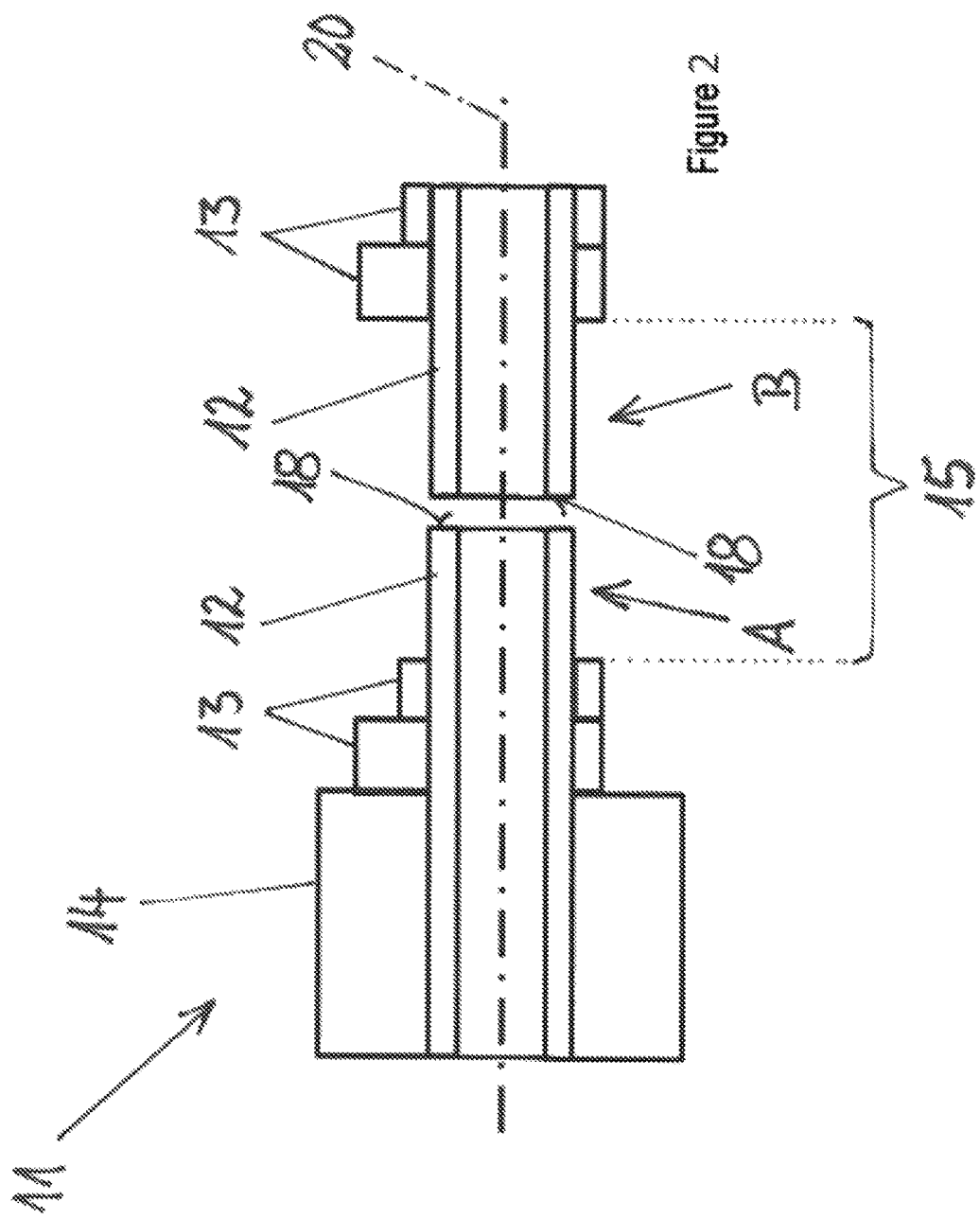
FIG. 2 is a schematic side cross section view of the displacement element of FIG. 1, showing the carrier tube cut as disclosed herein.

As per a further main method step, in FIG. 2, the displacement element 11 with the carrier tube 12, the cam elements 13 and the switching element 14 is shown, wherein the carrier tube 12 has been cut in accordance with the invention. After the cutting, the parting surfaces 18 may also be subjected to finish machining. As a result, as an intermediate step, two parts A and B of the displacement element 11 are obtained, wherein the cutting of the carrier tube 12 is performed in the region of the bearing section 15. For example, the parting plane is shown centrally in relation to the bearing section 15, and the parting plane may also lie eccentrically.

Figure 3:
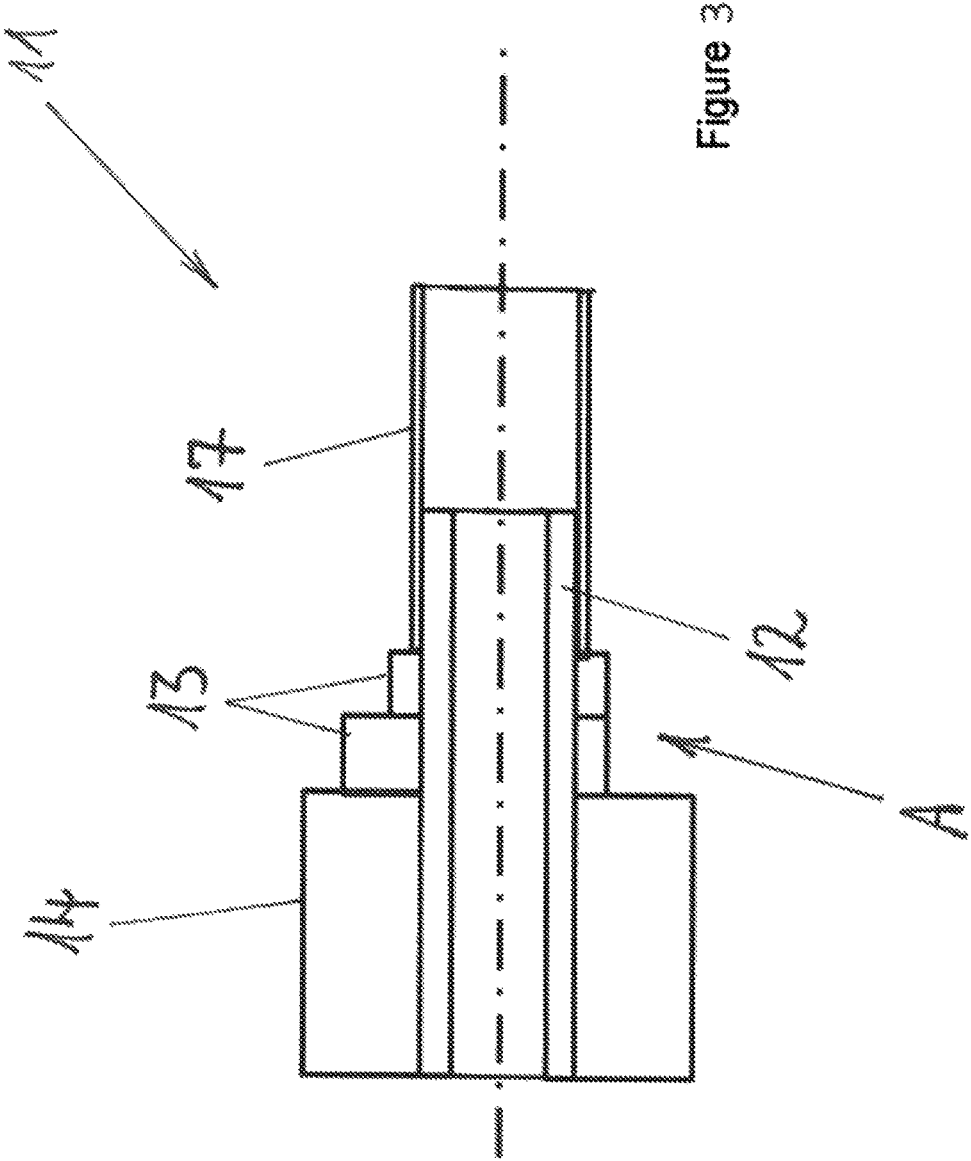
FIG. 3 is a schematic side cross section view of a portion of the displacement element of FIG. 2, showing the carrier tube attached to a connecting sleeve, as disclosed herein.

FIG. 3 shows a further method step, in which a connecting sleeve 17 is provided which is attached to a free section of the carrier tube 12 of a part A of the displacement element 11. The cam elements 13, the switching element 14 and the attached, for example pressed-on, connecting sleeve 17 are thus situated on the part of the carrier tube 12. In the same way, it would also be possible for the connecting sleeve 17 to be pushed onto the part B of the displacement element 11, which is shown in FIG. 2.

Figure 4:
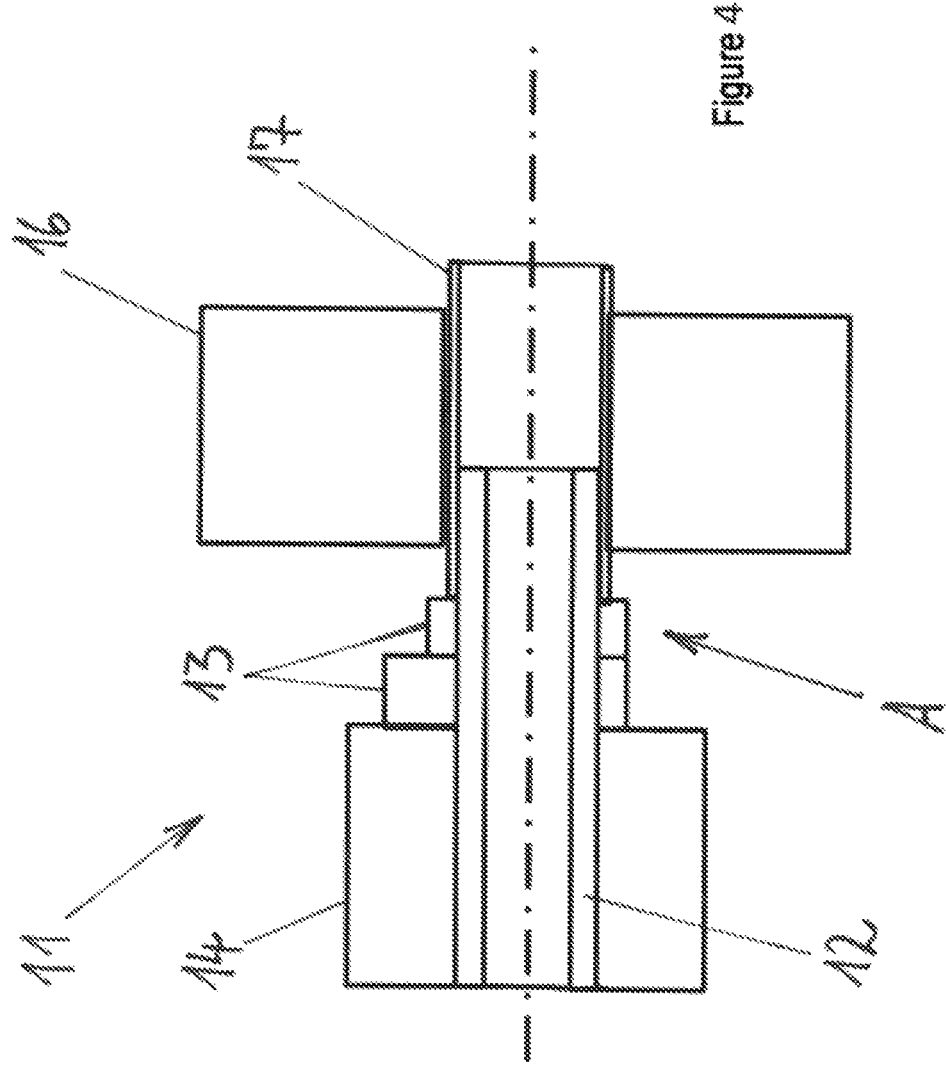
FIG. 4 is a schematic side cross section view showing of a portion of the displacement element attached to the connecting sleeve of FIG. 3, disposed in a bearing bridge of a module housing, as disclosed herein.

FIG. 4 finally shows the arrangement of the part A of the displacement element 11 with the carrier tube 12, the cam elements 13 and the switching element 14 in the bearing bridge 16, such that the connecting sleeve 17 has been led all the way through the bearing bridge 16. Here, the outer circumferential surface of the connecting sleeve 17 forms the inner sliding partner of the plain bearing formed with the bearing bridge 16, such that, as shown in FIG. 5, the further part B of the displacement element 11 can finally be joined to the first part A of the displacement element 11 again.

FIG. 5 shows the ready-for-use camshaft module 100 with a camshaft 1 which comprises, by way of example, a displacement element 11. The camshaft module 100 is schematically illustrated with a module housing 10 in which the bearing bridge 16 is incorporated. The bearing bridge 16 is in this case of non-split and closed form. The two parts A and B of the displacement element 11 have, from the respective sides of the bearing bridge 16 with the connecting sleeve 17, been pushed into the latter, such that the carrier tube 12 is, in a split state, a constituent part of the ready-for-use displacement element 11 of the camshaft 1. The first pair of cam elements 13 and the switching element 14 are seated on one part A of the displacement element 11. The part B of the displacement element 11 with the section of the carrier tube 12 is situated on the opposite side of the bearing bridge 16, and the two sections of the carrier tubes 12 are connected to one another by way of the connecting sleeve 17, which simultaneously forms the bearing section 15 by way of which the displacement element 11 is rotatably mounted in the bearing bridge 16.

For the completion of the camshaft 1, a toothed shaft 19 is inserted into the parts of the carrier tube 12 along the central axis 20. The toothed shaft 19 may for example be driven, outside the module housing 10, by way of a drive wheel, such that the displacement element 11 co-rotates with the toothed shaft 19. Here, the displacement element 11 remains axially displaceable in the direction of the central axis 20, wherein the illustrated axial position of the displacement element 11 forms an intermediate position, which may be situated for example between two switching positions of the displacement element 11.

The invention is not restricted, in terms of its embodiment, to the preferred exemplary embodiment specified above. Rather, numerous variants are conceivable which make use of the presented solution even in fundamentally different embodiments. All of the features and/or advantages which emerge from the claims, from the description or from the drawings, including design details or spatial arrangements, may be essential to the invention both individually and in a wide variety of combinations.

What is claimed is:

1. A method for arranging a camshaft in a camshaft module for the valve drive in an internal combustion engine, wherein the camshaft module comprises a module housing in which at least one camshaft is accommodated, wherein the camshaft comprises at least one displacement element with a carrier tube, with at least two cam elements for the valve actuation and with a switching element for the axial adjustment of the displacement element in the module housing, and wherein the cam elements and the switching element are attached to the carrier tube such that an interposed bearing section for the mounting of the displacement element in a bearing bridge of the module housing is formed, the method comprising:
   arranging the cam elements and the switching element on the carrier tube, with the bearing section being formed, so as to provide the displacement element outside the module housing;
   cutting the carrier tube in the region of the bearing section into two parts so as to create a first part and a second part by way of a cutting method;
   arranging a connecting sleeve on either of the first or second parts;
   inserting either of the first or second parts into the bearing bridge in the module housing; and
   joining the other of the first or second parts to the first or second part that was inserted into the bearing bridge.

2. The method of claim 1, further comprising machining the displacement element that is to be provided outside the module housing into a ready-for-use state by way of at least one chip-removing machining process.

3. The method of claim 1, further comprising placing the connecting sleeve on the outside of the bearing section of the carrier tube.

4. The method of claim 1, further comprising one of press fitting, shrink fitting, or adhesively bonding the connecting sleeve onto the outside of the bearing section of the carrier tube.

5. The method of claim 1, further comprising machining the carrier tube in the region of the bearing section to have an outer diameter that is less than or equal to an inner diameter of the connecting sleeve before the carrier tube is cut into two parts.

6. The method of claim 1, further comprising machining the inner surface and/or outer circumferential surface of the connecting sleeve with one of a grinding process or a polishing process.

7. The method of claim 1, wherein said cutting step is performed by one of a sawing process, an abrasive cutting process, a thermal cutting process, or a laser-beam cutting process.

8. The method of claim 7, further comprising after said cutting step but prior to said joining step, machining the parting surfaces of the carrier tube formed from said cutting step by a chip-removing machining process.

* * * * *